July 21, 1959 — H. G. COMPTON — 2,895,139
FISH CLEANING GLOVE SET
Filed Sept. 7, 1954 — 2 Sheets-Sheet 1
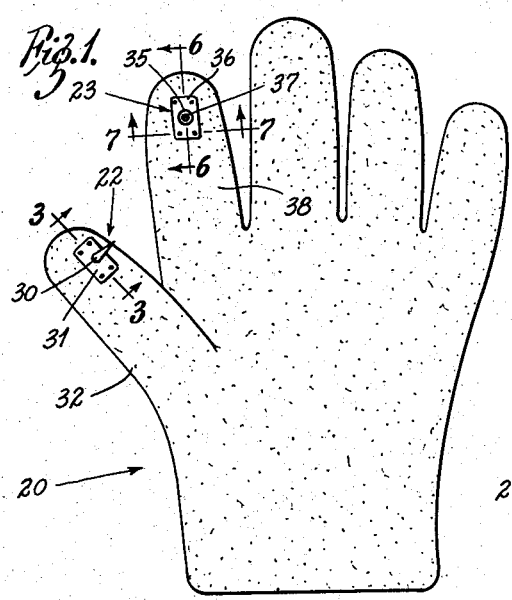
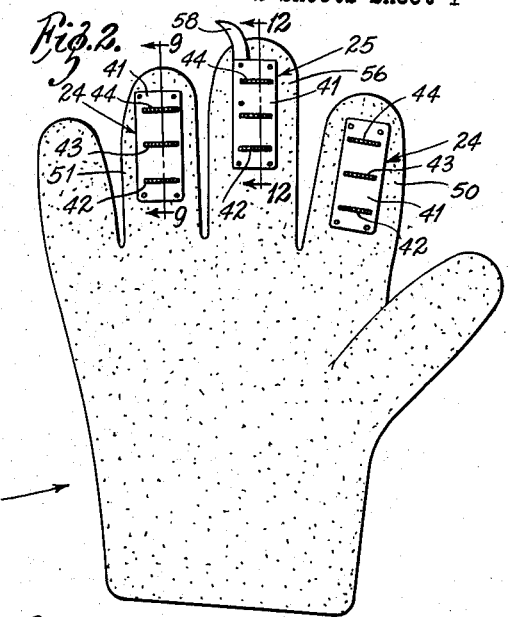
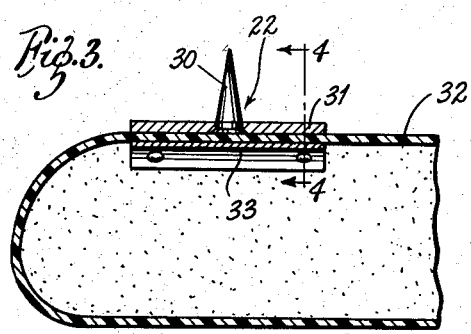
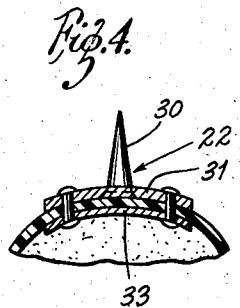
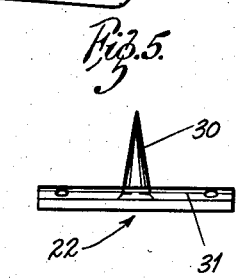
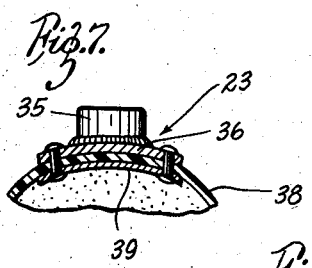
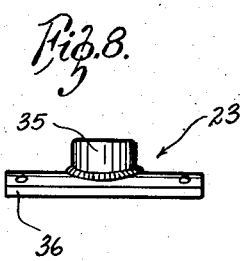
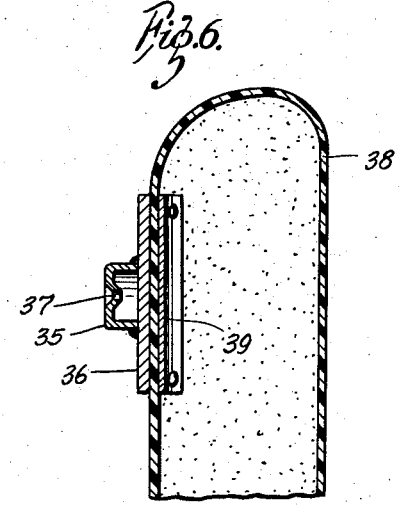
INVENTOR:
HAROLD G. COMPTON,
By Kingsland, Rogers & Ezell
ATTORNEYS

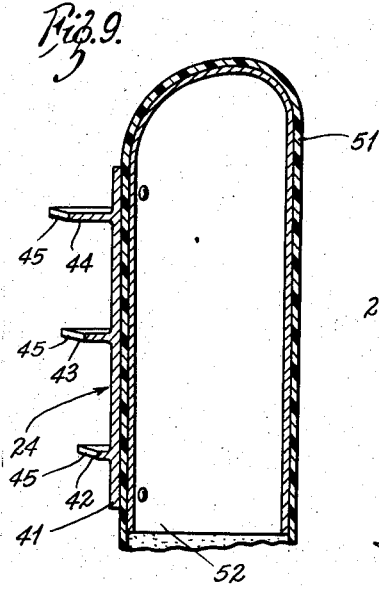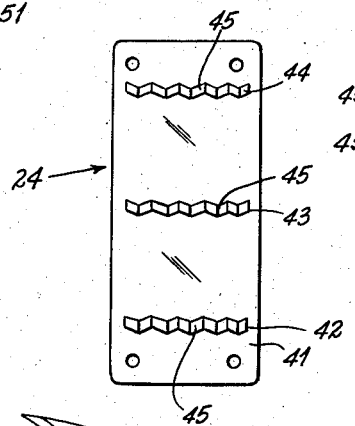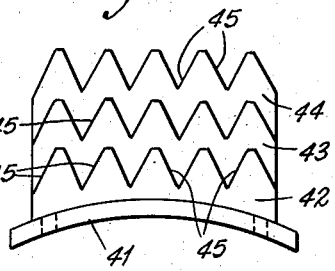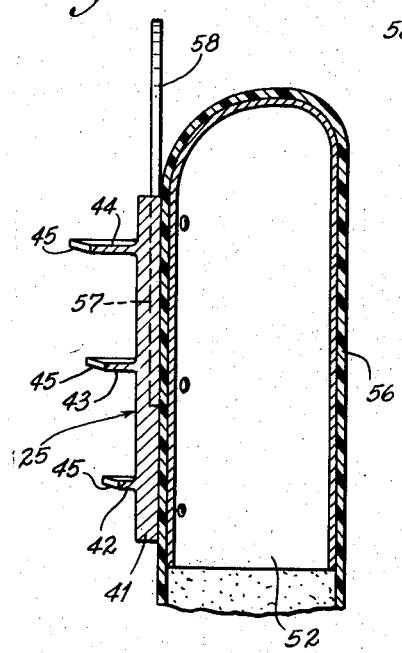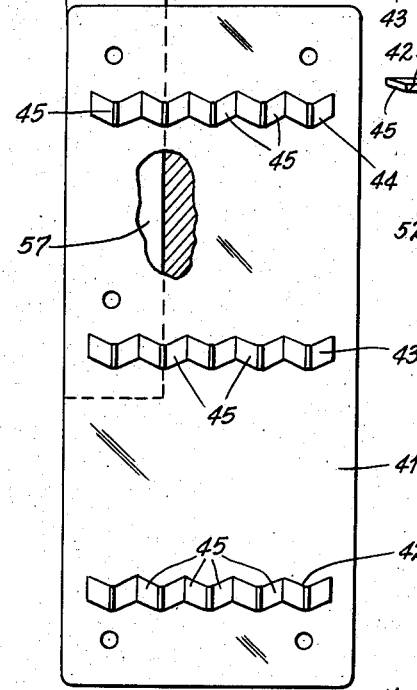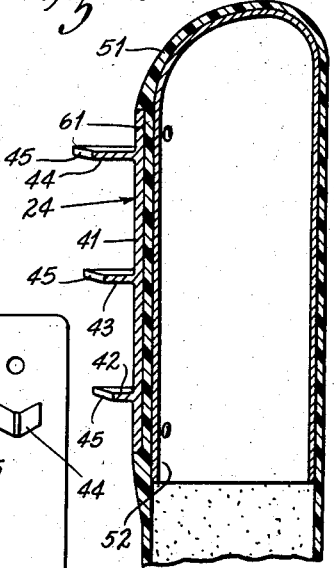

United States Patent Office 2,895,139
Patented July 21, 1959

2,895,139

FISH CLEANING GLOVE SET

Harold G. Compton, Jennings, Mo.

Application September 7, 1954, Serial No. 454,508

5 Claims. (Cl. 2—161)

This invention relates to improvements in fish cleaning and scaling devices, and in particular is concerned with gloves having elements thereon that permit carrying out of these operations.

In brief, this invention includes a glove set in which one glove is provided with fish grasping elements and the other glove is provided with a fish gutting knife and scaling elements. These gloves perform a multifeatured service in protecting the hands of the operator from damage, and also in allowing the efficient and very satisfactory cleaning of the fish with a minimum of time, labor and equipment.

In this invention, one glove is provided with a pin feature by means of which the tail of the fish may be secured in the hands of the operator so as to hold it in firm engagement. The other glove is provided with scaling elements on three of its fingers and a gutting knife in conjunction with one of the scaling elements on one finger. The gutting knife makes possible the gutting of the fish in one simple, quick slash while the tail is grasped by the gloved hand of the operator. Then, without changing tools or gloves in any manner, the gutted fish can then be laid on its side and scaled by scraping the scaling elements on the fingers of the glove along the sides of the fish. The scaling device is so formed that the curved contour of the fish is mated with the edges of the scaling device which greatly improves the efficiency of the scaling operation.

Accordingly, it is an object of this invention to provide gloves having elements thereon by means of which a fish cleaning operation can be carried out.

It is a further object of this invention to provide a glove set comprising one glove which has fish grasping elements thereon, and another glove having fish cleaning and scaling elements in which the cleaning and scaling of fish can be carried out as a combined operation.

It is still a further object of this invention to provide a fish cleaning glove for grasping a fish having piercing elements whereby the tail of the fish may be secured firmly in the grasp of the operator.

Yet another object of this invention is to provide a fish cleaning glove in which a glove has fingers provided with a plurality of scaling elements situated along the length of the individual fingers.

Still another object of this invention is to provide a fish cleaning glove for cleaning and scaling a fish wherein there are a plurality of scaling devices on the fingers of the glove, and one finger is provided with a knife extending out from the tip thereof by which the gutting of a fish may be performed.

Yet a further object of this invention is to provide a fish cleaning glove set in which a grasping device upon one of the gloves and scaling and gutting elements upon another glove are secured to the finger pieces of the gloves by securing elements which place no strain upon the glove material.

Still a further object of this invention is to provide a fish cleaning glove set in which fish grasping and cleaning elements are provided from standard materials of construction, are of a high strength with relatively low cost and are easy to manufacture.

Further objects of this invention will appear in the detailed description which follows, and will further be apparent to those skilled in the art.

For the purpose of description, reference will now be had to the accompanying drawings showing embodiments of this invention, but it is to be understood that these showings are for the purpose of description only and that the invention is not limited thereto.

In the drawings:

Figure 1 is a view of the grasping glove of this invention for the left hand;

Figure 2 is a view of the cleaning glove for the right hand;

Figure 3 is a sectional view taken on the line 3—3 of Figure 1 showing the fish piercing element;

Figure 4 is a sectional view taken on line 4—4 of Figure 3 showing the manner of attachment of the piercing element of the thumb;

Figure 5 is a side view of the piercing element;

Figure 6 is a sectional view taken on the line 6—6 of Figure 1 showing a centering or receiving element for the thumb piercing element;

Figure 7 is a sectional view on line 7—7 of Figure 1 showing the manner of securing the receiving element;

Figure 8 is a side view showing the pin receiving element;

Figure 9 is a sectional view on line 9—9 of Figure 2 showing the construction of one of the scaling elements;

Figure 10 is a top plan view of the scaling element of Figure 9;

Figure 11 is a view in rear elevation of the scaling element of Figure 10;

Figure 12 is a sectional view taken on line 12—12 showing the construction of the combined scaling element and gutting knife;

Figure 13 is an enlarged top plan view of the combined scaling element and gutting knife of Figure 12; and Figure 14 is a sectional view taken down the middle of one of the fingers showing a modified form for securing the scaling element to the glove finger.

The gloves of this invention for a right handed person are shown in their complete form in Figures 1 and 2 wherein the fish grasping glove is generally indicated at 20 and the fish cleaning and scaling glove is generally indicated at 21. The grasping glove includes as its main elements a piercing element 22 and a pin receiving element 23. The cleaning glove is comprised of a plurality of scaling elements 24 upon its fingers and has in combination upon its central finger a combination scaling element and gutting knife 25.

The gloves are conveniently made from an organic plastisol and can be made in the desired form by conventional processes. The organic plastisol is of especial advantage since it is resistant to the corrosive material encountered in the cleaning of fish and does not react adversely to such organic matter as blood, entrails, and the like. In addition, the waterproof characteristics are of great advantage to the wearer.

The piercing element 22 is more particularly shown in Figures 3, 4 and 5 where it is seen to comprise a pin 30 secured to a base 31. The base in turn is secured to the thumb 32 by an underlying plate-like support 33 by a riveting connection.

The receiving element 23 is shown in Figures 6, 7 and 8. This element includes a centering member 35 which is secured to a base 36. The centering member is recessed in the form of an inverted funnel and is provided with an opening 37 which accommodates the pin 30 to provide for proper centering. The centering device is secured to the forefinger 38 by an underlying base plate 39 by rivets.

The scaling elements 24 are more definitely shown in Figures 9, 10 and 11. These elements include a flat base 41 from which arise vertical scalers 42, 43 and 44. These scalers increase in their vertical size from the rear to the tip of the finger in order to conform to the contour of the fish, as will appear more fully hereinbelow. The tops of these scalers are serrated as at 45 to provide for proper scaling. The base 41 is also slightly contoured so as to conform to the curvature of the operator's finger.

The scaling elements 24 are secured to the forefinger 50 and the third finger 51 by internal cylindrical finger stalls or thimbles 52 by riveting or the like. This provides for very firm attachment and puts no strain upon the finger material of any consequence.

The combination scaler and gutting knife 25 is fastened in a similar manner by a finger stall 52 to the middle finger 56. Since the scaling element is substantially identical with the scaling elements 24 the same reference numerals will be used for like parts. However, it will be noted that the base 41 is partially cut out at one corner in rectangular fashion so as to receive at its bottom the butt portion 57 of a curved knife 58. This knife is secured by rivets to the base 41 and the finger stall 52 with the finger piece 56 resting therebetween.

A modified form for securing the scaling elements to the finger piece of the glove is shown in Figure 14. In this modification the scaling element 24 is seated within a recess 61 of the finger piece 50 which is built up so that its outer edge is flush with the surface of the base 41. The other finger pieces 51 and 56 can be built up in a like manner as can also be the thumb and forefinger of the grasping glove 20. This manner of securing the bases gives a greater strength and, in addition, by the elimination of any sharp corners between the base and the glove finger prevents any debris from collecting or attaching thereto. This elimination of debris and organic matter minimizes wearing out at the corners and obviates the collection of foul organic matter which would be objectionable.

*Use*

The gloves of this invention are readily used in the cleaning of fish in a simple and efficacious manner. This is effected by grasping the tail of the fish with the left hand in such a manner that the pin 30 pierces the fish and is centered in the centering member 35. This provides for a firm grasping of the tail of the fish so that the gutting and cleaning operation can be effected.

After grasping the fish in the aforesaid manner, the fish is allowed to be suspended vertically and the knife 58 on the middle finger of the right hand is then used to gut the fish in a slashing operation from a top position to a bottom position which will be from the rear to the front of a fish along its belly. This gutting operation is performed by the knife in the usual fashion by cleaning out the entrails and cleaning from the anus up to adjacent the throat of the fish.

After this has been accomplished, the fish is laid on a flat surface with the tail still being grasped. At this point the right hand of the operator is placed at the rear of the fish so that the scalers 42, 43 and 44 rest in contact with the fish body. Since the fish is generally curved with the tail being thinner than the middle body portion, it will be evident that these scalers will mate with the contour of the fish so that there is no portion left out of contact when the gloved hand is drawn from the rear of the fish toward the front in the usual manner of scaling. Since there are three of the scaling elements upon the fingers of the glove, it will be evident that a very efficient scaling operation can be performed in a minimum of time without exposing the hands of the wearer in any fashion.

If desired, the scalers 24 can be extended to the little finger and thumb of the glove 21, as will be apparent to those skilled in the art. Also, if desired, the piercing element 22 can be extended to other fingers, such as the forefinger of the left hand glove 20, to provide for a multigripping force upon the tail of the fish.

It is apparent that other changes and modifications may be made in this invention as will be apparent to those skilled in the art, and such modifications are within the teachings thereof as defined by the claims appended hereto.

What is claimed is:

1. A fish cleaning glove, said glove having a plurality of scaling means on its finger portions, said scaling means including a plurality of serrated metallic scaling elements spaced from one another along the length of and extending transversely across the individual finger portions, a gutting knife extending longitudinally from and beyond the tip of one of said finger portions, and anchoring means for securing said gutting knife and scaling elements to said glove comprising outer and inner members secured to both sides of the glove material and for relieving strains thereon.

2. A fish cleaning glove set composed of a grasping glove and a cleaning glove for use together, both of said gloves having a plurality of appendages, said grasping glove having piercing means on at least one of the appendages adapted to pierce a fish and hold it in firm engagement, anchoring means for securing the piercing means to said grasping glove, said piercing means comprising a pin-like member, centering means secured to one of the other appendages for receiving the point of said pin-like members, said cleaning glove have a plurality of scaling means on its appendages, said scaling means including a plurality of scaling elements spaced from one another along the length of the individual appendage, said scaling elements decreasing in vertical height in a direction away from the tip of the individual appendage, and a gutting knife extending beyond the tip of one of said appendages.

3. A fish cleaning glove set composed of a grasping glove and a cleaning glove for use together, both of said gloves having a plurality of appendages, said grasping glove having piercing means on at least one of the appendages adapted to pierce a fish and hold it in firm engagement, anchoring means for securing the piercing means to said grasping glove, said piercing means comprising a pin-like member, centering means secured to one of the other appendages for receiving the point of said pin-like member, said cleaning glove having a plurality of scaling means on its appendages, said scaling means including a plurality of scaling elements spaced from one another along the length of the individual appendage, said scaling elements decreasing in vertical height in a direction away from the tip of the individual appendage, a gutting knife extending beyond the tip of one of said appendages, and anchoring means for securing said pin-like member, centering element, scaling elements and gutting knife to said glove comprising outer and inner members secured to both sides of the glove material and for relieving strains thereon.

4. A fish cleaning glove, said glove having a plurality of scaling means on its finger portions, said scaling means including a plurality of serrated metallic scaling elements spaced from one another along the length of extending transversely across the individual finger portions, said scaling elements being rigid and decreasing in vertical height in a direction away from the tip of the individual finger portions, a gutting knife extending longitudinally from and beyond the tip of one of said finger portions, and anchoring means for securing said gutting knife and scaling elements to said glove comprising outer and inner members secured to both sides of the glove material and for relieving strains thereon, said inner member conforming to the entire interior of the finger tip.

5. A fish cleaning glove, said glove having a plurality of scaling means on its finger portions, said scaling means including a plurality of scaling elements spaced from one another along the length of the individual finger portions, a gutting knife extending longitudinally from and beyond the tip of one of said finger portions, and anchoring means for securing said scaling elements to said glove comprising outer and inner members secured to both sides of the glove material and for relieving strains thereon, said glove member being of an organic plastic material and having a molded recess within its finger portions for receiving said outer anchoring member.

References Cited in the file of this patent

UNITED STATES PATENTS

| | | |
|---|---|---|
| 183,375 | Cutliff | Oct. 17, 1876 |
| 513,724 | Perkins | Jan. 30, 1894 |
| 583,310 | Northrup | May 25, 1897 |
| 1,243,622 | Nielsen | Oct. 16, 1917 |
| 2,501,571 | Liedtke | Mar. 21, 1950 |
| 2,524,979 | Kimbrell | Oct. 10, 1950 |
| 2,616,745 | Alston | Nov. 4, 1952 |
| 2,710,971 | Hall | June 21, 1955 |

FOREIGN PATENTS

| | | |
|---|---|---|
| 280,113 | Switzerland | Apr. 16, 1952 |